US006866195B2

(12) United States Patent
Knowles et al.

(10) Patent No.: US 6,866,195 B2
(45) Date of Patent: Mar. 15, 2005

(54) SYSTEMS AND METHODS OF INVENTORY MANAGEMENT UTILIZING UNATTENDED FACILITIES

(75) Inventors: Clyde W. Knowles, Woodstock, GA (US); Douglas David Fratt, Cumming, GA (US); Robert F. Joyce, Alpharetta, GA (US); Juwono W. Bong, Lawrenceville, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 32 days.

(21) Appl. No.: 10/285,115

(22) Filed: Oct. 31, 2002

(65) Prior Publication Data

US 2004/0084526 A1 May 6, 2004

(51) Int. Cl.[7] ................................................ G06F 17/60
(52) U.S. Cl. ........................ 235/385; 235/375; 235/382; 235/383; 235/487; 235/492; 340/568.01; 705/26
(58) Field of Search ................................. 235/385, 375, 235/382, 383, 492, 487, 454, 453; 340/568.01; 705/26

(56) References Cited

U.S. PATENT DOCUMENTS

| | | | |
|---|---|---|---|
| 4,635,053 A | 1/1987 | Banks et al. | |
| 4,636,634 A | 1/1987 | Harper et al. | |
| 4,698,630 A | 10/1987 | Ellsberg | |
| 4,803,348 A | 2/1989 | Lohrey et al. | |
| 4,894,717 A | 1/1990 | Komei | |
| 4,961,507 A | 10/1990 | Higgins | |
| 5,057,677 A | 10/1991 | Bertagna et al. | |
| 5,091,713 A | 2/1992 | Horne et al. | |
| 5,126,732 A | * 6/1992 | Mardon ..................... | 340/5.33 |

(List continued on next page.)

FOREIGN PATENT DOCUMENTS

| | | |
|---|---|---|
| JP | 405274597 A | 10/1993 |
| JP | 411104005 A | 4/1999 |
| WO | WO 01/99037 A1 | 12/2001 |

OTHER PUBLICATIONS

SmarteCarte, http://www.smartcarte.com/lockers/laptop.html Accessed in Sep. 2002. Applicants make no admission that this reference constitutes prior art.

Far East Lockers, http://www.fargogroup.com/gb/east_lockers/download/Logibag_lockers_GB.PDF Accessed in Sep. 2002. Applicants make no admission that this reference constitutes prior art.

*Primary Examiner*—Michael G. Lee
*Assistant Examiner*—Steven S. Paik
(74) *Attorney, Agent, or Firm*—Alston & Bird LLP

(57) ABSTRACT

An inventory management system utilizes unattended facilities remote from a central warehouse for service parts logistics. Items are placed in inventory in secure enclosures at the unattended facilities by the inventory management service. The unattended facilities may be located near one or more customers to reduce a service technician's travel time and customers' inventory costs. A service technician utilizes a passcode to retrieve needed items. The service technician may order items that are not kept in the inventory of the unattended facility in which case the items may be delivered to the unattended facility and the service technician may receive a notification related to all the items that comprise an order that the order is ready for pick up at an unattended facility. Unused, used or damaged parts may be returned by a technician to a remote secure enclosure where such returned parts may be retrieved and disposed of, repaired or placed back into inventory if not damaged or after repair, and the processing of such returned parts begins by information entered into a data entry device at the remote secure enclosure location. Return items that are not damaged may be included in the inventory of an unattended facility.

41 Claims, 10 Drawing Sheets

U.S. PATENT DOCUMENTS

| | | | |
|---|---|---|---|
| 5,169,222 A | | 12/1992 | Bollore et al. |
| 5,205,436 A | | 4/1993 | Savage |
| 5,206,637 A | | 4/1993 | Warren |
| 5,212,644 A | * | 5/1993 | Frisch ........................ 705/418 |
| 5,223,829 A | * | 6/1993 | Watabe ...................... 340/5.73 |
| 5,231,272 A | | 7/1993 | Mardon |
| 5,386,462 A | | 1/1995 | Schlamp |
| 5,455,409 A | | 10/1995 | Smith et al. |
| 5,475,378 A | | 12/1995 | Kaarsoo et al. |
| 5,509,572 A | | 4/1996 | Curtis |
| 5,774,053 A | * | 6/1998 | Porter ..................... 340/568.1 |
| 5,946,660 A | * | 8/1999 | McCarty et al. ................ 705/5 |
| 5,979,750 A | | 11/1999 | Kindell |
| 6,010,064 A | * | 1/2000 | Umeda et al. ............... 235/375 |
| 6,010,239 A | | 1/2000 | Hardgrave et al. |
| 6,028,517 A | | 2/2000 | Sansone et al. |
| 6,123,223 A | | 9/2000 | Watkins |
| 6,230,971 B1 | | 5/2001 | Matsumoto et al. |
| 6,300,873 B1 | | 10/2001 | Kucharczyk et al. |
| 6,323,782 B1 | | 11/2001 | Stephens et al. |
| 6,344,796 B1 | | 2/2002 | Ogilvie et al. |
| 6,367,696 B1 | * | 4/2002 | Inamitsu et al. ............. 235/381 |
| 6,422,457 B1 | | 7/2002 | Frich et al. |
| 6,439,345 B1 | * | 8/2002 | Recktenwald et al. ......... 186/55 |
| 6,690,997 B2 | * | 2/2004 | Rivalto ........................ 700/237 |
| 2001/0017507 A1 | | 8/2001 | Hara |
| 2001/0032443 A1 | | 10/2001 | Tiley et al. |
| 2001/0034673 A1 | | 10/2001 | Yang et al. |
| 2001/0042024 A1 | | 11/2001 | Rogers |
| 2001/0050615 A1 | | 12/2001 | Kucharczyk et al. |
| 2002/0032501 A1 | | 3/2002 | Tilles et al. |
| 2002/0035515 A1 | * | 3/2002 | Moreno |
| 2002/0042665 A1 | | 4/2002 | Kakuta |
| 2002/0067261 A1 | | 6/2002 | Kucharczyk et al. |
| 2002/0077937 A1 | | 6/2002 | Lyons et al. |
| 2002/0107820 A1 | | 8/2002 | Huxter |
| 2002/0116289 A1 | | 8/2002 | Yang |
| 2002/0118111 A1 | | 8/2002 | Brown et al. |
| 2002/0153994 A1 | | 10/2002 | Bonner |
| 2002/0177922 A1 | | 11/2002 | Bloom |
| 2003/0040980 A1 | | 2/2003 | Nakajima et al. |

* cited by examiner

SYSTEMS AND METHODS OF INVENTORY MANAGEMENT UTILIZING UNATTENDED FACILITIES

BACKGROUND OF THE INVENTION

1. Field of the Invention

The present invention relates generally to inventory management utilizing unattended secure facilities and more particularly to systems and methods for the distribution of service parts from a supplier to a user and for the return of parts from the user to a supplier or other entities utilizing unattended facilities.

2. Description of Related Art

Technicians (such as computer repair technicians) often require new parts in order to complete a particular repair. Generally, in the past, when a technician needed a new part, the worker would request the part from a warehouse, travel to the warehouse, pick up the part at an attended distribution counter within the warehouse, travel to the place where the part was needed, and then install the part.

The parts distribution method described above has several drawbacks. First, this method requires technicians to travel to a warehouse each time they need a new part, which can be inconvenient and time consuming. Alternatively, a courier may pick up the required part from a warehouse and meet the technician at a designated location. This can incur added courier costs and delay time while the technician waits to meet the courier. Moreover, if the courier and the technician fail to meet, it may cause a service failure. Second, the parts distribution method described above only allows technicians to pick up parts when the attended warehouse is staffed and open for business or requires extra expense or extraordinary arrangements for "after-hours" pickup. Third, because the warehouses are often busy, technicians often have to wait in line before receiving their requested parts from a warehouse representative, thus further delaying the repair.

To address some of the problems with the parts distribution method described above, some companies began to provide, at their warehouses, a set of secure lockers that can be used for distributing parts without the assistance of a warehouse representative. Typically, after a technician calls such a company to request a certain part, a warehouse worker places the requested part into a secure, unattended locker within a computer-controlled bank of secure lockers. When the technician arrives at the bank of lockers, the worker preferably uses a keypad at the bank of lockers to enter access information (e.g., the technician's User ID, PIN, or an appropriate order number) into the bank of lockers. In response to the user entering the proper access information, the locker containing the customer's part is unlocked allowing the technician to pick up the requested part.

Although such locker systems reduced some problems with early warehouse part distribution systems (such as waiting in line and only being able to access the parts when the distribution center is staffed), there are still many problems associated with these systems. For example, these systems still require a user or a courier to travel to a warehouse to pick up the parts. In addition, they require warehouse workers to move parts from the warehouse to the lockers each time a part is ordered. Furthermore, such systems do not provide for a convenient method of allowing users to return damaged or unused parts or, if such parts are returned, the returning technician may need to obtain some form of authorization prior to dropping off the returned part at the unattended facility.

Other forms of unattended distribution systems are also known in the art. For instance, U.S. Pat. No. 6,010,064 issued on Jan. 4, 2000 to Umeda et al., ("the '064 patent"), generally discloses an unattended commodity distributing locker apparatus whereby commodities are dropped off by a customer, processed by a service company, and returned to the locker after processing by the service company. More specifically, the '064 patent contemplates a customer entering certain information into the system by either a keypad or a membership card. The system then prints a bar-coded label that is placed with the item in the locker. Upon pick up by the service company, the bar-coded label is scanned to identify the commodity. After processing, the items are returned to the locker system by the service company. The customer then enters the membership card or other personal information to retrieve the processed items from the lockers. By entering a membership card or certain personal information into the system the customer is associated with a processed item.

U.S. Pat. No. 6,344,796 issued on Feb. 5, 2002 to Ogilvie et al., ("the '796 patent"), discloses an unattended cross-docking system whereby local shippers can exchange custody of goods with regional or national shippers to achieve better transportation economics. The '796 patent provides for a facility and method that can be used by businesses and individuals for receipt and storage of goods without requiring them to be present at the time of delivery. It also provides a facility and method for businesses and individuals to leave goods for pick-up by a shipper. The system provides notification and an access code to a local shipper when items are left in storage. Such notification may be by voice message, fax or e-mail. Another embodiment of this reference discloses a system whereby the storage devices are placed at some convenient location along the routes where consumers drive home. This bank of storage devices serves as a depot to receive shipments from multiple vendors and permit pickup by consumers.

The above-described systems generally provide a one to one relationship where a technician will place an order for one or more parts, the order is delivered to an unattended facility by a shipper or parts service, depending upon the number and size of the parts associated with the order the parts may be placed in one or more secure unattended enclosures at the unattended facility and the technician receives a separate notification for each part that is placed in a separate enclosure. These multiple notifications for a single order are often inconvenient and confusing for the technician ordering the part as well as increasing the messaging traffic. The technician will then travel to the unattended secure location to retrieve the parts.

Unattended drop off facilities are secure facilities where parts that are intended to be returned to an inventory management service are placed until pick up by the inventory management service or its agents (i.e., commercial couriers or shippers). When returning unused, used or damaged parts, a technician generally may be required to first await receipt of some form of authorization before placing the parts in an unattended drop off facility. An inventory management service generally receives the returned part in its warehouse before information about the returned part may be entered into its return parts system to begin the return parts processing.

Therefore, systems and methods are needed to address the challenges associated with expediting parts retrieval and parts return, notifying a customer that a part or order is ready to be picked up, decreasing a technician's travel time to retrieve or return a service part and expediting the processing of returned parts.

BRIEF SUMMARY OF THE INVENTION

Generally speaking, the present invention overcomes the challenges of the prior art by providing systems and methods for the unattended distribution of an inventory of parts from a supplier to a user and for the return of parts from the user to a supplier or other facility. The present invention utilizes remote secure enclosures in an unattended inventory management system for service parts logistics where items are placed in the lockers by an inventory management service, the technician may receive a single notification that the items are ready for pick up and the items are retrieved by the technician for the repair and or maintenance of the technicians' clients' equipment. Also provided are systems and methods of returning unused, used or damaged parts by a technician to a remote secure enclosure where such returned parts may be retrieved and disposed of, repaired or placed back into inventory if not damaged or after repair, and the processing of such returned parts begins by information entered into a data entry device at the remote secure enclosure location.

Unattended Inventory Facilities and Parts Pooling

The system includes a secure enclosure or area such as, for example, a set of secure lockers or a secure room or rooms (i.e., a remote unattended inventory facility) that are remote from one or more warehouses. These secure remote unattended inventory facilities may be maintained at a convenient location (e.g., at a central location that is close to two or more customers, or on-site at a customer's offices). The ability to place the unattended facilities in such a convenient location accommodates the pooling of inventory items kept in the unattended facilities by more than one customer, thereby reducing total inventory costs. An inventory management service places an inventory of parts into the secure remote unattended inventory facility for later pickup by a technician for use at a customer's location. An inventory management service may be a vendor that performs its own inventory management and maintenance services or a third-party logistics entity such as, for example, UPS Supply Chain Solutions, to whom the vendor outsources all or part of its logistics needs. A technician may also be personnel from a third party, a vendor or a customer. Parts or items may also be directly placed in an unattended inventory facility by a manufacturer, vendor, repair facility, courier, shipper, etc. or may be re-located from unattended facility to unattended facility. When a technician arrives at the secure remote unattended inventory facility, the technician preferably uses a keypad or some other data entry device to enter access information (e.g., the technician's ID, an order number, etc.) in order to gain access to the secure area where the parts are located or are to be returned. After the technician enters proper access information, the locker or room containing the customer's part is unlocked allowing the technician to retrieve a part. The same access control may be applied for inventory personnel to put parts into the locker or room for later retrieval by a technician.

In other embodiments of the invention radio frequency identification ("RFID") tags may be used to capture item transactions (retrieval and/or restocking) automatically with an RFID reader. Items may be associated with an RFID tag. An RFID reader associated with the unattended facility may be used to record the retrieval and placement of items in the unattended facility. Further, RFID readers associated with the individual enclosures that comprise an unattended facility may automatically record the placement and removal of items in the enclosures. Likewise, a customer may be associated with an RFID tag. The RFID tag may be encoded with identification and authorization information. A customer may gain access the unattended facility by having their RFID tag read. If the information encoded onto the RFID tag is authorized, then the customer will be provided with access to the unattended facility.

Unattended inventory facilities are generally commercially available products consisting of multiple enclosures with doors that have electronic locking mechanisms. The inventory facilities are also comprised of one or more processors that control the electronic locking mechanisms, communications with a central server, and access programming, among other functions. Access to an enclosure is generally recorded either on memory at the unattended facility or such access information is transmitted to the central server via a network. Generally, the unattended inventory facility is programmed for a user's access by transmitting an access code from the central server or by prior recording of a PIN or some other form of a passcode to the unattended inventory facility's processor. A user will then use this access code (such as order number or some portion of it) and/or a PIN assigned to the user, to access the locker system and perform a parts transaction such as retrieving or stocking a part. Information about the user's access is transmitted to the central server and is available for an inventory management service whereby the inventory in the locker system is appropriately decremented/incremented. Re-stocking decisions can be made based upon the inventory levels in the unattended inventory facility. For example, if inventory levels are below an established minimum an order may be automatically generated to replenish the inventory level. Alternatively, the enclosures may be secured rooms or any sort of a secured enclosure that operate on the same premise as a locker. Further, the parts stored within the secure enclosures may have encoded identification tags (such as RFID tags) and monitoring devices such that the removal or placement of parts within the enclosures may be recorded.

Combined Notification for Order Spanning Multiple Enclosures

Another aspect of the invention relates to notification of an intended recipient of an item placed in an unattended inventory facility. In some situations, for example, a technician may place an order with an inventory management service for items that are not kept in inventory in an unattended inventory facility. The inventory management service will deliver the order to the unattended inventory facility that is convenient to the technician. This order may consist of more than one item. The size and quantity of the items may require that they be placed in more than one locker or enclosure. Prior art unattended inventory or distribution systems generally created a separate notification for each item placed in a separate enclosure. This resulted in the technician receiving multiple notifications for a single order when the order consisted of multiple items placed in a plurality of enclosures. This could be confusing and irritating to the technician.

The present invention reduces such duplicity of notifications by sending only a notification that relates to all the items of an order to the ordering technician, preferably a single notification, even if the order consists of multiple parts and such parts are placed in more than one enclosure. Such notification may be, for example, in the form of an email, a page to a paging device, a telephone call, a radio frequency signal, a facsimile, etc.

Return Parts

Yet another aspect of the invention involves the return of parts to an unattended drop off facility. Such parts may have been unused surplus taken out of inventory by a technician, damaged parts that are being returned for repair or disposal, used parts that are still operable, parts returned under a warranty, etc. The technician returns the part to an unattended drop off facility. A technician gains access to the unattended drop of facility by entering identification and/or authorization information into a data entry device at the unattended drop off facility. Information about the part and the reason for its return is then entered into the data entry device located adjacent to the unattended drop off facility. An identification device such as, for example, a barcoded label or RFID tag, etc. may be attached to the return part and such device may be encoded with information indicating whether the part is "good" or "bad" and other information about the part. The identification device may be encoded with the data entered into the data entry device. For example, a printer may be located at the unattended drop off facility and upon entering information about the part to be returned into the data entry device, the user may be queried as to whether they wish to generate a barcoded return label. If the user answers affirmatively to the query, a return label is generated and printed by the printer and the label is associated with the return part by the user. Likewise, an RFID tag may be associated with the return part. In another aspect, a conventional encoder may encode an RFID tag with information entered into the data processing device and then associated with the return part.

The return part is then deposited into a secure locker, bin or other enclosure that is associated with the unattended drop off facility. Information entered by the user into the data entry device at the unattended drop off facility location is transferred by one or more processors associated with the unattended drop off facility via a network to a central server. Such information avoids the user from having to await a return authorization from the inventory management service or a manufacturer. The entered information is also transmitted to the inventory management service long before the return part is moved and allows pre-processing of the return part to begin which accelerates the processing of the return part. Inventory management decisions may also be made from the return parts information. In one embodiment, the remote unattended drop off facility may be associated with a remote unattended inventory facility. For instance, the unattended drop off facility may be co-located with an unattended inventory facility or the unattended drop off facility may be incorporated into the unattended inventory facility. In this embodiment, for example, the central server will check the inventory quantities at the unattended inventory facility of the particular part that is being returned. If the inventory quantities are below a designated level and the return part is identified as "good," the return part may be placed in the inventory of the associated unattended inventory facility. This may be accomplished by the technician placing the "good" part in a certain bin and quantity of the inventory of that part at that unattended inventory facility incremented. Or, inventory management personnel may transfer the "good" part from a bin associated with the unattended drop off facility to a locker associated with the unattended inventory facility and increment the inventory quantity of the unattended inventory facility. If the inventory quantities at the remote unattended inventory facility are in excess of a designated maximum, inventory management personnel or a courier may return the part to a centralized warehouse or any other attended facility, or the part may be placed in the inventory of another unattended inventory facility. The present invention is capable of monitoring the inventory quantities of attended and unattended facilities and distribute "good" return items to facilities where they are most needed. Furthermore, this may result in cost savings over the traditional method of transporting all return parts to a central warehouse and then distributing them to where they are needed.

Conclusion

The present invention makes parts that are required for service more readily available. Further, cost savings may be realized through inventory consolidation, courier run consolidation, reduced labor costs, increased technician efficiency, and faster return processing. The system is more flexible than traditional warehouse inventory management as the remote unattended inventory facilities and unattended drop off facilities may be strategically located near customers without the expense of a traditional warehouse. Advantageously, inventory items may be pooled among a plurality of customers. For example, an unattended inventory facility may be strategically located near two customers. Each of these two customers may have an occasional, infrequent need for a high-cost part. Inventory costs may be reduced by the two customers (or one service provider that serves both customers) reaching an agreement to keep one of the high-cost, low-demand parts in the secure unattended facility rather than each customer keeping a separate one of the high-cost parts on-hand. Also, the remote unattended facilities may be re-located if necessary with relatively small expense.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
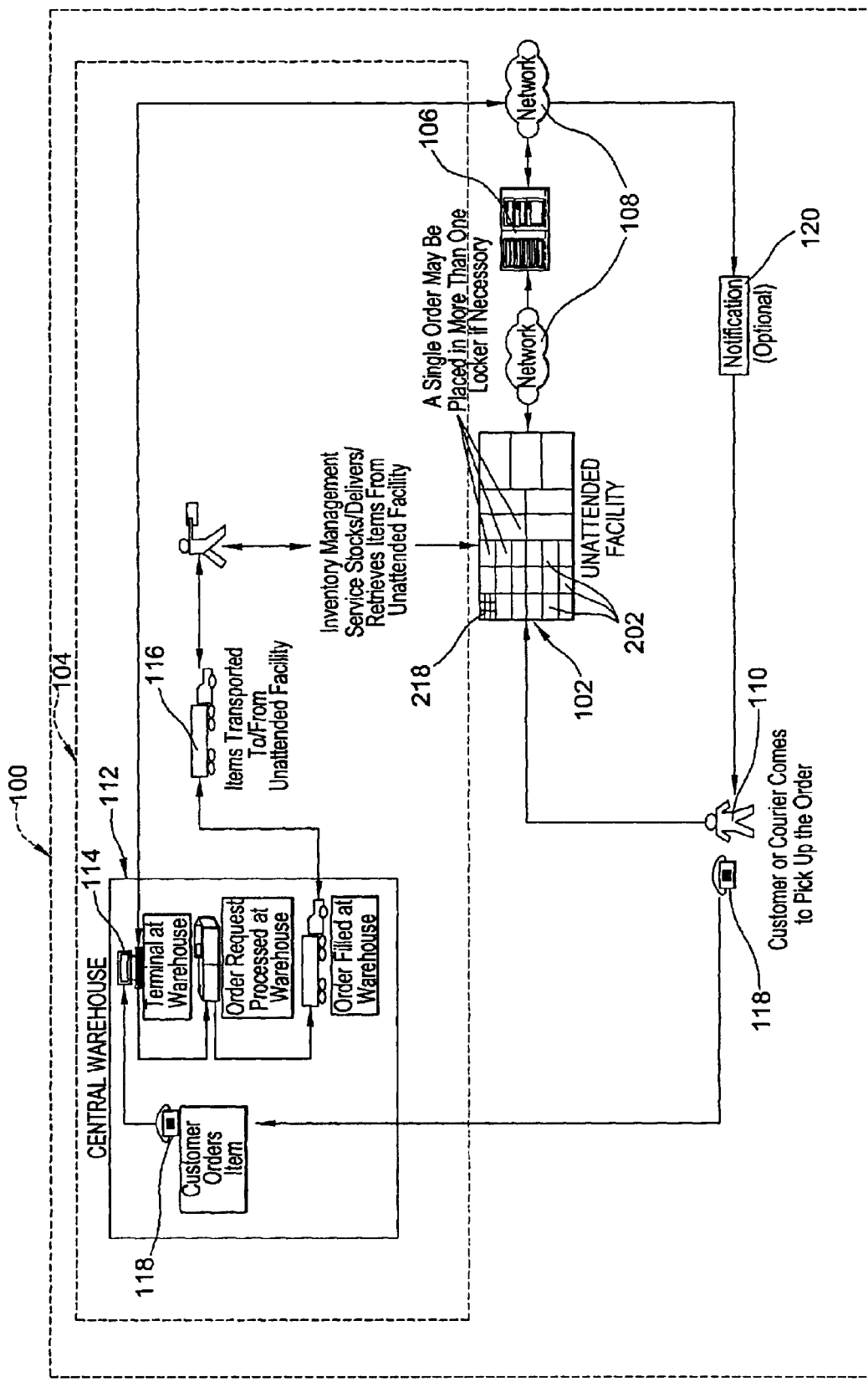
FIG. 1 is a diagrammatic representation of an exemplary system for inventory management utilizing an unattended facility with lockers in an embodiment of the invention.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Inventory management utilizing unattended facilities generally encompasses several broad concepts. In accordance with one concept an inventory of parts is continuously maintained in an unattended inventory facility by an inventory management service. The unattended inventory facility may be comprised, for example, of one or more secure enclosures, which may be lockers, rooms, enclosures or secure areas with locking mechanisms to such secure enclosures controlled by one or more processors. The unattended inventory facility may be located at or near one or more customers' facilities. Depending upon customers' needs, various parts are maintained in certain quantities within the secure enclosures of the unattended facilities. Parts are retrieved from the on-hand inventory contained within the unattended inventory facility as needed. One or more forms of identifying information such as a passcode, PIN, order number, etc. may be required to be entered into a data entry device at the unattended inventory facility in order to gain access to one or more secure enclosures. If the level of inventory decreases below a predetermined minimum quantity in an unattended inventory facility, the inventory management service will re-stock the inventory to the appropriate level. The unattended inventory facility may be connected to a network and provide information to a central server such that access and inventory levels of the unattended facility may be remotely monitored. The central server may automatically generate a re-stocking order from the monitored information. The re-stocking order may be based upon factors such as a predetermined economic order quantity.

Another broad concept is where a part is needed that is not maintained in the inventory of the unattended inventory facility. In this instance, an order may be placed for the desired part with delivery to the secure unattended inventory facility. The delivery may be made by an inventory management service or a shipping service. The order will then be retrieved from the unattended inventory facility at the convenience of the one who placed the order. An order may consist of more than one part. In some instances, the complete order may not be able to be placed in a single secure enclosure because of the size and/or number of parts associated with the order. In other words, the order may "span" more than one locker or secure area. A notification is generally provided to the entity that placed the order when the order is delivered to the unattended inventory facility and is ready for pick up. Prior art systems generally provided a separate notification for each part that is placed in a separate secure enclosure. Therefore, a single order may result in multiple notifications if the order spans more than one secure enclosure. An embodiment of the present invention alleviates multiple notifications by providing one notification for the delivery of a single order, regardless of the number of secure enclosures in which the order is placed.

A third broad concept of inventory management utilizing unattended facilities involves unattended drop off facilities. Unattended drop off facilities may be utilized for the return of unused, used or damaged parts. Such parts may be returned because they are not needed, for repair, for warranty purposes, etc. The return parts are first brought to the unattended drop off facility. An unattended drop off facility is similar to an unattended inventory facility in that it is generally comprised of one or more secure enclosures, which may be lockers, bins, rooms or secure areas, one or more processors that control access to the secure areas and communications with a server, a data entry device, and a connection to a central server via a network. Access to a secure enclosure is then obtained by entering identification information such as one or more of a passcode, user ID, PIN, order number, etc. into a data entry device at an unattended drop off facility. Additional information pertaining to the returned part may also be entered into the data entry device. Such information may relate to the reason for returning the part, whether the part is "good" or "bad", etc. A form of identification (a "return identifier") may then be associated with the return part. These return identifiers may be generated by a device at the unattended drop off facility such as, for example, a printer capable of printing barcoded labels or a device capable of programming a programmable RFID tag. The return identifiers may be pre-existing devices such as, for example, pre-printed barcode labels or "pre-programmed" RFID tags. The return identifier may be encoded with some or all of the information about the part that has been entered into the data entry device. The part along with its associated return identifier is then placed into the secure enclosure. Information entered into the data entry device may be used for to begin the processing of the returned part, including, for example, populating a database on the central server with information about the return part that may be utilized by the inventory management service. Such information may also preclude a user having to await receiving an authorization for return material before returning a part. The part may then be retrieved from the unattended drop off facility by the inventory management service, a courier or a shipping service and brought to a central warehouse for further processing or the part may be returned to a manufacturer. This entered information may expedite the handling of the returned part.

Furthermore, inventory decisions may be facilitated from the information entered into the data entry device when returning a part to an unattended drop off facility. For example, if a returned part is "good" and is only being returned because it is not needed, the part may be brought back into a centralized warehouse by the inventory management service and then placed in inventory in an unattended inventory facility. In some instances, an unattended drop off facility may be co-located with an unattended inventory facility or the drop off facility may be incorporated into an unattended inventory facility. In such instances, the inventory levels of parts in the associated unattended inventory facility may be compared with a "good" return part that is placed in the unattended drop off facility. If the inventory level of that returned part in the associated unattended inventory facility is below a certain maximum level, then the part is transferred to the inventory of the unattended inventory facility at the convenience of the inventory management service. If the inventory level of that returned part in the associated unattended inventory facility is at or above a certain maximum level for that part, then the part is returned to a warehouse or transferred to another attended or unattended inventory facility at the convenience of the inventory management service.

The unattended inventory facilities or the unattended drop off facilities or the co-located (both unattended inventory facility and unattended drop off facility) may be placed at locations remote from one or more central warehouses but convenient to one or more customers. Conveniently locating these facilities reduces delay time caused by retrieval or return of parts. Furthermore, multiple customers may "pool" their inventory of high-cost, low demand items in an unattended inventory facility such that each customer's parts inventory cost is reduced while yet not significantly decreasing the likelihood of parts availability and not significantly increasing the time to retrieve a needed part.

These concepts are each discussed in further detail below.

Referring now to FIG. 1, an inventory management system utilizing unattended facilities (100) is generally comprised of one or more centralized warehouses (112) (the term "central warehouse" is used herein to denote one or more warehouses), one or more secure unattended facilities (102) comprised of at least a secure enclosure (202), a data entry device (218), a central server (106) that may be comprised of one or more servers that may or may not be located at the same location and a network (108); an inventory management service (104) comprised of at least a central warehouse (112), a communication device (118) capable of receiving an order from a customer (110), a transportation device (116) capable of transporting inventory items to and from an unattended facility (102), and an interface (114) with the central server (106) via the network (108). The secure unattended facility (102) may be an unattended inventory facility or an unattended drop off facility or a facility that is both, an unattended inventory facility and an unattended drop off facility. The secure unattended facilities (102) are generally remote from a central warehouse (112). A customer (110) will either retrieve parts from the unattended facility (102) or will return parts to the unattended facility (102) for later pick up by the inventory management service (104) or a shipping company. The customer (110) may receive a notification (120) once an order placed by the customer (110) is ready for pick up. Such a notification (120) is generally an electronic transmission such as, for example, a page to a paging device, a telephone call, an email, a transmission to a personal digital assistant ("PDA"), or by some other form of notifying the customer (110). It may contain additional information such as, for example, a passcode that can be used to access the unattended facility (102).

Figure 2C:
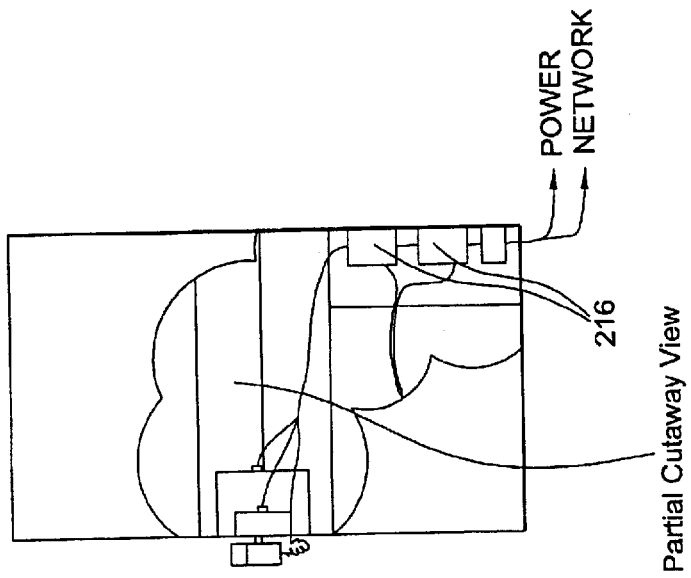
FIG. 2C is a side view of the pictorial view of an exemplary unattended facility with lockers of FIG. 2A with portions broken away to show interior detail in an embodiment of the invention.
Figure 2A:
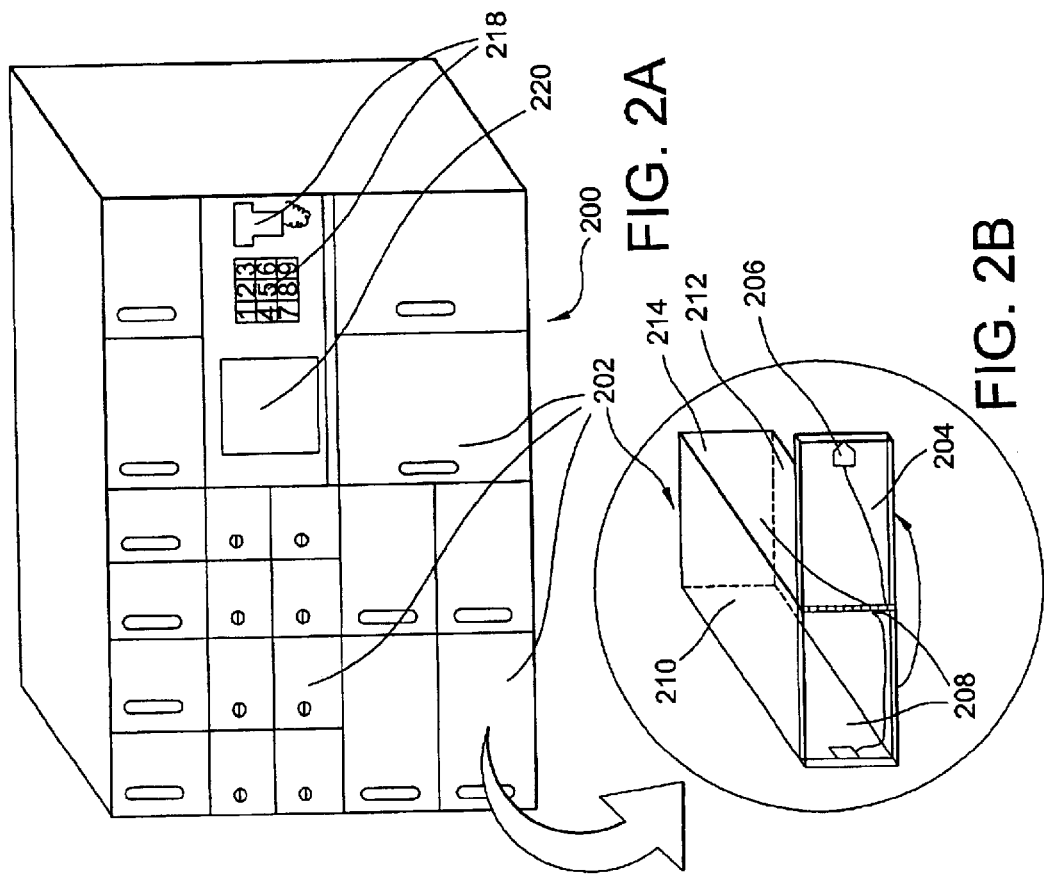
FIG. 2A is a pictorial view of an exemplary unattended facility with lockers in an embodiment of the invention.
Figure 2B:
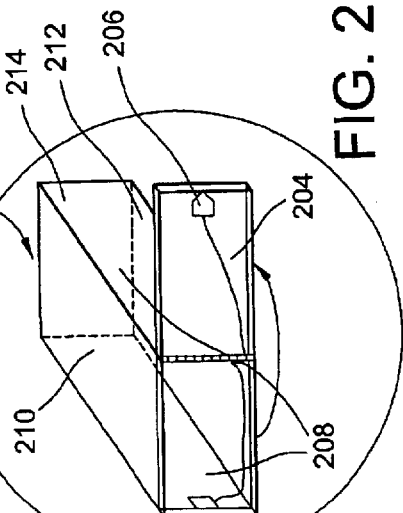
FIG. 2B is a pictorial view of a locker in an exemplary unattended facility in an embodiment of the invention.

The secure unattended facilities (102) are generally products that are commercially available from, for example, SALock, Inc./TEKWave, Inc. of Duluth, Ga., or SupplyPro, Inc. of San Diego, Calif. The products may also be patented, reference U.S. Pat. No. 6,300,873 issued on Oct. 9, 2001 to Kucharczyk, et al.; U.S. Pat. No. 5,774,053 issued on Jun. 20, 1998 to Porter; U.S. Pat. No. 5,979,750 issued on Nov. 9, 1999 to Kindell; and International Application Number PCT/US01/19421 filed Jun. 19, 2001 by Buie et al., each incorporated herein and made a part hereof. FIGS. 2A, 2B and 2C illustrate an embodiment of an exemplary unattended facility (200). FIG. 2A is a pictorial view of an exemplary unattended facility with lockers in an embodiment of the invention. FIG. 2B is a pictorial view of a locker in an exemplary unattended facility in an embodiment of the invention and FIG. 2C is a side view of the pictorial view of an exemplary unattended facility with lockers of FIG. 2A with portions broken away to show interior detail in an embodiment of the invention. The unattended facility is generally comprised of one or more secure enclosures such as lockers (202) of various sizes. Each locker (202) has a door (204) with a lock (206), sides (208), top (210), bottom (212) and a back (214). In another embodiment (not shown), the locker (202) may not have a back (214) to facilitate placing items in the locker (202) from a restricted area. In other embodiments (not shown), the locker (202) may have ventilation means such as holes or holes with forced ventilation such as, for example, a fan. In yet other embodiments, the lockers (202) may be heated or cooled depending upon the requirements of items that are placed within. Each lock (206) is controlled by one or more processors (216) located within the unattended facility (200). The processors (216) are programmed to unlock specific lockers (202) when certain identifying and authorizing information (i.e., a passcode such as, for example, a PIN, order number, name, badge number, etc.) is entered into or read by a data entry device (218). The data entry device (218) may be, for example, a keypad, a barcode scanner, an infrared scanner, an RFID reader, a voice recognition device, a touch screen, etc. Some embodiments of the unattended facility (200) will have a display device such as, for example, a display screen (220). In one embodiment, the processors (216) may be programmed locally through the data entry device (218) to allow access to one or more lockers (202) when the correct identifying information is entered. The unattended facility (200), referring to FIGS. 1 and 2, is connected to a central server (106) via a network (108). In other embodiments, the processors (216) may be programmed for access to lockers (202) by information sent from the central server (106) via the network (108).

The inventory management service (104) such as, for example, UPS Supply Chain Solutions, is an organization that makes an inventory of parts available to a customer (110). Traditionally, such parts were kept in a warehouse controlled by the inventory management service (104) and were either delivered to the customer (110) by the inventory management service (104), a courier or a commercial shipper. Alternatively, the customer (110) may retrieve the parts from the warehouse. In an embodiment of the present invention, the inventory management service (104) provides several services, including controlling one or more centralized warehouses (112), maintaining an inventory of parts for one or more customers (110) in the unattended facilities (102), providing and delivering special order parts to unattended facilities (102) for later pick up by customers (110), monitoring access to and inventory levels of unattended facilities (102), programming the processors (216) of unattended facilities (102) for access by customers (110) and retrieving returned parts from an unattended drop off facility or placing such parts back into inventory. The inventory management service (104) may work concurrently with commercial couriers and shippers or its customers for the placement of parts in an unattended facility and the retrieval of return parts or it may perform these functions through its own personnel and equipment.

The network (108) may be one or a combination of wireless, wired, fiber optic, or any other medium capable of transferring information. It may utilize one or more technologies such as the Internet, telephone, paging systems, email, etc.

The customer (110) is generally a service group that is known to the inventory management service (104) and that utilizes technicians to maintain certain equipment of one or more clients. As an illustrative example, the customer (110) may be a computer corporation ("Computer Corporation") and the customer's client a stock exchange (the "Stock Exchange"). The Stock Exchange will have contracted with Computer Corporation for the maintenance and repair of its computer systems. Parts needed for the maintenance and repair of such systems will be maintained by the inventory management service (104) in the inventory of an unattended inventory facility located at or near the Stock Exchange facility. In other instances, the customer (110) may perform maintenance and repair functions for more than one client and the unattended facility (102) will be located remote from the central warehouse (112) yet proximate to both clients. In the above example, for instance, Computer Corporation may also perform maintenance and repair for a brokerage firm ("Brokerage Firm") as well as the Stock Exchange. The unattended facility (102) may be located in close proximity to both the Stock Exchange and Brokerage Firm to decrease Computer Corporation's delay while retrieving or returning parts. Furthermore, Computer Corporation, or Computer Corporation in combination with the Stock Exchange and Brokerage Firm may decide to pool its inventory of high cost, low demand parts. For example, if both the Stock Exchange and Brokerage Firm have the same or similar systems that require an expensive part that fails infrequently (i.e., "Part X"), Computer Corporation may keep one Part X in the unattended facility (102) that is in close proximity to the Stock Exchange and Brokerage Firm rather than keeping two Part Xs. This ability to pool parts for multiple customers is a cost saving benefit of the present invention. In yet other instances, the customer (110) and the client are the same because the client will perform its own maintenance and repair of its systems. Then, in these instances, the multiple customers (e.g., the Stock Exchange and Brokerage Firm) may reach an agreement to pool their inventory of high cost, low frequency parts in order to achieve savings in their parts inventory.

The communications device (118) may be any device capable of receiving an order from a customer (110) such as, for example, a telephone, an email system, Internet access, a virtual private network, etc.

The transportation device (116) may be any device capable of transporting inventory items to and from an unattended facility (102) such as, for example, a vehicle including trucks, trains, etc.

The interface (114) with the central server (106) is generally a device connected to the network (108) and capable of receiving and sending information over the network to and from the central server (106).

Figure 3:
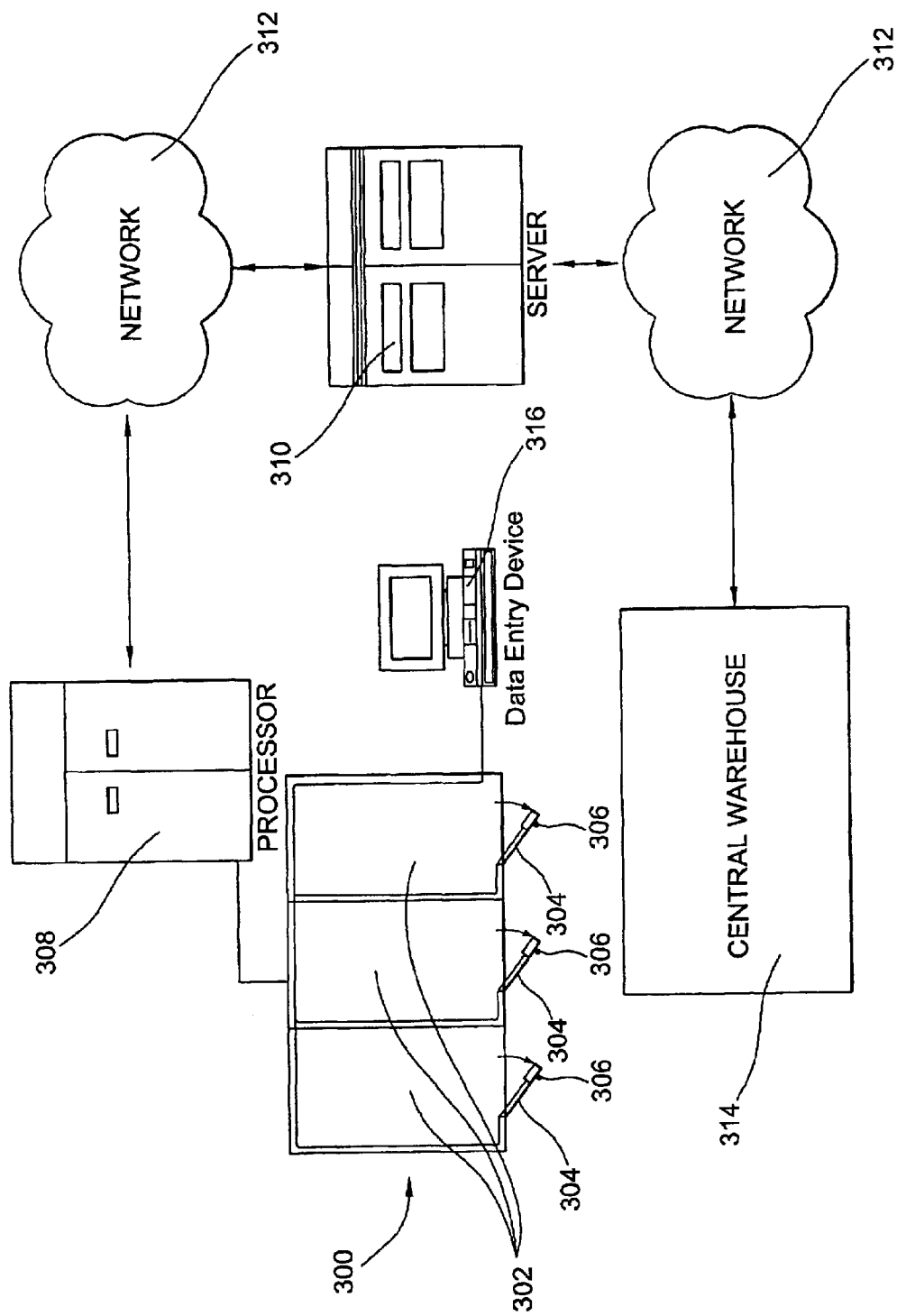
FIG. 3 is a diagrammatic representation of an exemplary system for inventory management utilizing an unattended facility with rooms in an embodiment of the invention.

Alternatively, in other embodiments as illustrated in FIG. 3, the unattended facility (300) may be comprised of one or more rooms (302), with each room having one or more doors (304) with each door having a lock (306). Each lock (306) is controlled by one or more processors (308). Similar to FIG. 1, the processor or processors (308) are connected to a central server (310) via a network (312). One processor (308) may control all the locks (306) on the doors (304) via solenoids, actuators or other devices incorporated in the locks (306), or each door (304) may have a separate processor (308). Also, the processor or processors (308) will control communications with the central server (310). Local communication with the processors (308) may occur with a data entry device (316) at the unattended facility (300). The central server (310) provides and receives information and instructions from the inventory management services central warehouse (314) via a network. Additional alternative embodiments may exist in the form of secure areas maintained within a larger building or room such as, for example, areas bounded by fencing inside a warehouse. Each area bounded by a fence will have a door to provide access to the secure area with a lock on the door controlled by one or more processors. The processors will be connected to a central server via a network.

Figure 4:
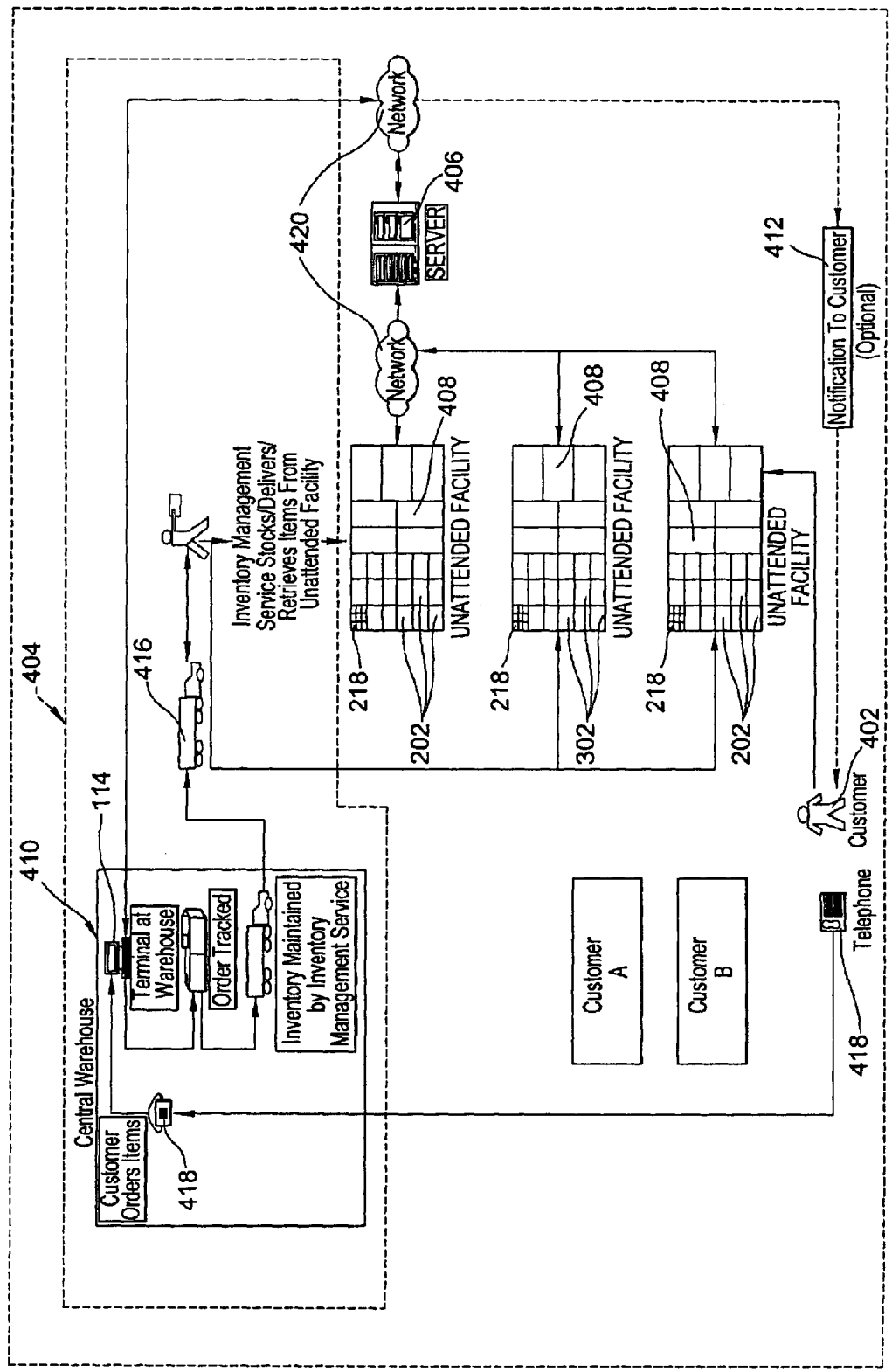
FIG. 4 is a diagrammatic representation of an exemplary system for providing a customer a requested item from the inventory of an unattended facility in an embodiment of the invention.

In one embodiment of the present invention, (referring primarily to FIG. 4 but also to FIGS. 2 and 3), a customer (402) places an order for one or more parts with an inventory management service (404). An order is placed by the customer (402) contacting the inventory management service (404) through a communications device (418) such as, for example, a telephone. The customer (402) is generally known to the inventory management service (404) through prior dealings or a contractual relationship. The central server (406) will have residing upon it information about the parts that are in the inventory of the unattended inventory facilities (408) that are associated with that server (406). The inventory management service (404) will check its inventory of parts in unattended inventory facilities (406) that are in close proximity to the customer's location. If the parts requested by the customer (402) are found to be in one or more unattended inventory facilities (408) that are in close proximity to the customer (402), the customer (402) will be provided with a notification (412) that includes the location of the unattended inventory facilities (408) and, in some instances, an order number or a passcode. The customer (402) or a courier under the direction of the customer (402), will then go to the unattended inventory facilities (406) as indicated by the inventory management service (404). The customer, or courier (402), will then enter one or more passcodes into a data entry device (218) at each unattended inventory facility (406). These passcodes may be associated with identifying and authorization information such as, for example, one or more of an order number or some part or combination of an order number, a user ID, a PIN, a badge number, a name, etc. The data entry device (218) may be, for example, a keypad, a barcode scanner, an infrared scanner, an RFID reader, a voice recognition device, etc. The processors (216) are preprogrammed to recognize certain passcodes. This preprogramming may have occurred by programming that occurred at the unattended inventory facility (408) location by authorized personnel, or the programming may occur by the transfer of information from the central server (406) to the processors (216) of the unattended inventory facility (408).

The passcode entered into the data entry device (218) of the unattended inventory facility (408), if recognized by the processors (216) of the unattended inventory facility (408) or by the central server (406), will allow the customer (402) access to the secure enclosures (202, 302) where the requested parts are located. Access will be gained either by the processors (216) automatically unlocking the doors (204) associated with the customer's (402) order or a display (220) will indicate to the customer (402) the available parts and the secure enclosures (202, 302) in which these parts are located. The customer (402) may then select the desired secure enclosures (202, 302) that will then have the locks (206) of their doors (204) opened by the processors (216). The accessed secure enclosures (202, 302) will contain one or more parts that are being held in inventory. Generally, the parts in any individual locker, room or secure area (202, 302) are of the same type. The processors (216) will monitor customers' (402) access to the secure enclosure (202, 302) and such access will be recorded by the central server (406). This access information along with the information known about the order (e.g., the type of parts desired and the quantity of each type desired) will allow the central server (406) to track the inventory quantities of parts in the unattended inventory facilities (408). Inventory replenishment decisions for the unattended inventory facilities (408) may be made from this inventory tracking information. Inventory tracking information may also be used for billing purposes. Customers (402) may be billed for any parts that they remove from the secure enclosures (202, 302). In another embodiment, the customer (402) owns the parts stocked within the unattended inventory facility (408) and pays service fees to the inventory management service (404).

In some instances, the parts requested by a customer (402) may not be kept in the inventory of unattended inventory facilities (408) located in close proximity to the customer (402). In those instances, the inventory management service (404) may remove the desired part(s) from the inventory of a central warehouse (410) or obtain them in some other manner, transport them to the unattended facility and deliver them to an unattended inventory facility (408) for later pick up by a customer (402). Such delivery may be made by personnel from the inventory management service (404) using a transportation device (416) or a courier or commercial shipper under the direction of the inventory management service (404). The inventory management service (404), or a courier or commercial shipper acting for the inventory management service (404), will gain access to the unattended inventory facility (408) in a similar manner as when a customer (402) retrieves parts from an unattended inventory facility (408). Namely, the inventory management service (404) will enter authorization and identification information into a data entry device (218) at the unattended inventory facility (408) that will enable the inventory management service (404) access to certain secure enclosures (202, 302) to place the delivered parts. In some instances, if the order consists of more than one part, all the parts may not be able to be placed into a single secure enclosure (202, 302). In such instances, the parts that comprise the order may be placed into separate secure enclosures (202, 302).

The customer (402) may receive a notification (412) that the ordered parts have been delivered to the unattended inventory facility (408) and are ready for pick up. Generally, this notification (412) may be in the form of an electronic page, an email, a telephone call, a facsimile, or by any other form of notifying the customer (402) that the order has been delivered. In one embodiment of the present invention, the customer (402) receives only a single notification (412) when an order is delivered to an unattended inventory facility (408), even if the order is placed in more than one locker, rooms or secure areas (202, 302). This is an improvement over prior art systems that provide a separate notification (412) for each part that is placed in a separate secure enclosure (202, 302). After the ordered parts have been placed in the unattended inventory facility (408), the customer (402) will access the secure enclosures (202, 302) and retrieve the parts by entering a passcode in a data entry device (420) and gaining access to the secure enclosures (202, 302).

Figure 5:
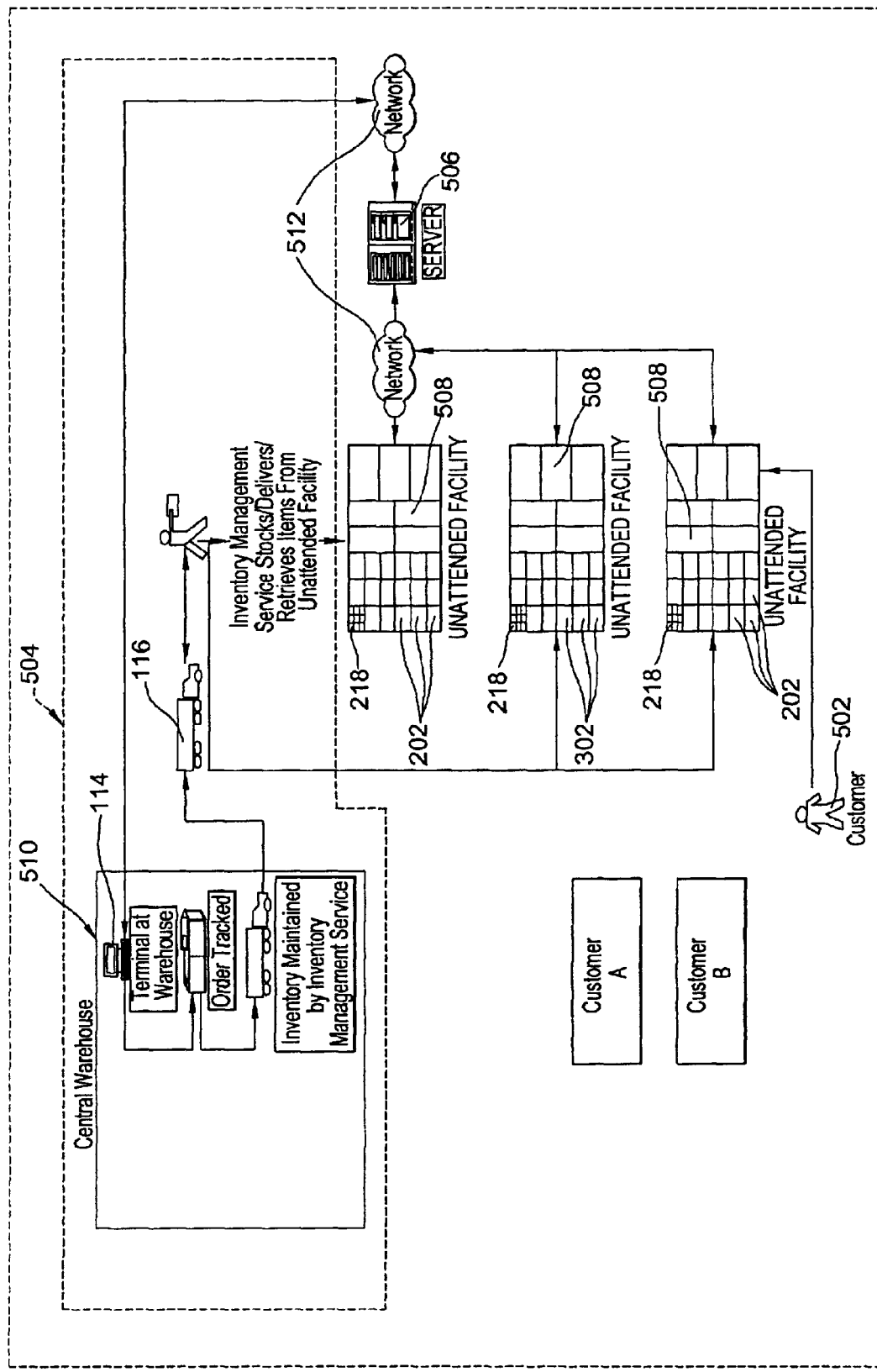
FIG. 5 is a diagrammatic representation of an exemplary system for providing a customer with an item from the inventory of an unattended facility in an embodiment of the invention.

Another embodiment of the present invention is a system where the customer (402) does not place an order with the inventory management service (404) before going to an unattended inventory facility (408) to retrieve parts. FIG. 5 illustrates a system where the customer (502) has been previously assigned a passcode that allows the customer (502) access to the unattended inventory facility (508). The customer (502) has prior knowledge of the location of the unattended inventory facility (508) and the parts contained therein. As described above, access to the unattended inventory facility (508) is gained by entering the pre-assigned passcode into a data entry device (218) at the unattended inventory facility (508). The customer (502) will be provided information about the contents of the secure enclosures (202, 302) by means such as, for example, a display screen (220), a plaque, notes, signs, etc. located at the unattended inventory facility (508).

After gaining access to the unattended inventory system (508) by use of the pre-assigned passcode, the customer (502) will then select the secure enclosure (202, 302) that contains the desired part or parts by entering information into the data entry device (218). The customer (502) may also be required to enter into the data entry device (218) the quantity of parts they are retrieving from each secure enclosure (202, 302) that is accessed. Once a secure enclosure (202, 302) is selected the processors (216) will cause the lock (206) to the door (204) to that locker, room or secure area (202, 302) to become unlocked. The customer (502)

will then retrieve the part or parts from the secure enclosure (202, 302) and then close the door (204), thus causing the lock (206) to engage and lock the door (204) shut. Information about the customer's access to the unattended inventory facility (508), as well as information about the secure enclosures (202, 302) accessed and the quantities of parts retrieved will be transferred to the central server (506) via the network (512). This information will be stored on the central server (506) and used for inventory management purposes, including re-stocking decisions and billing purposes.

Figure 6:
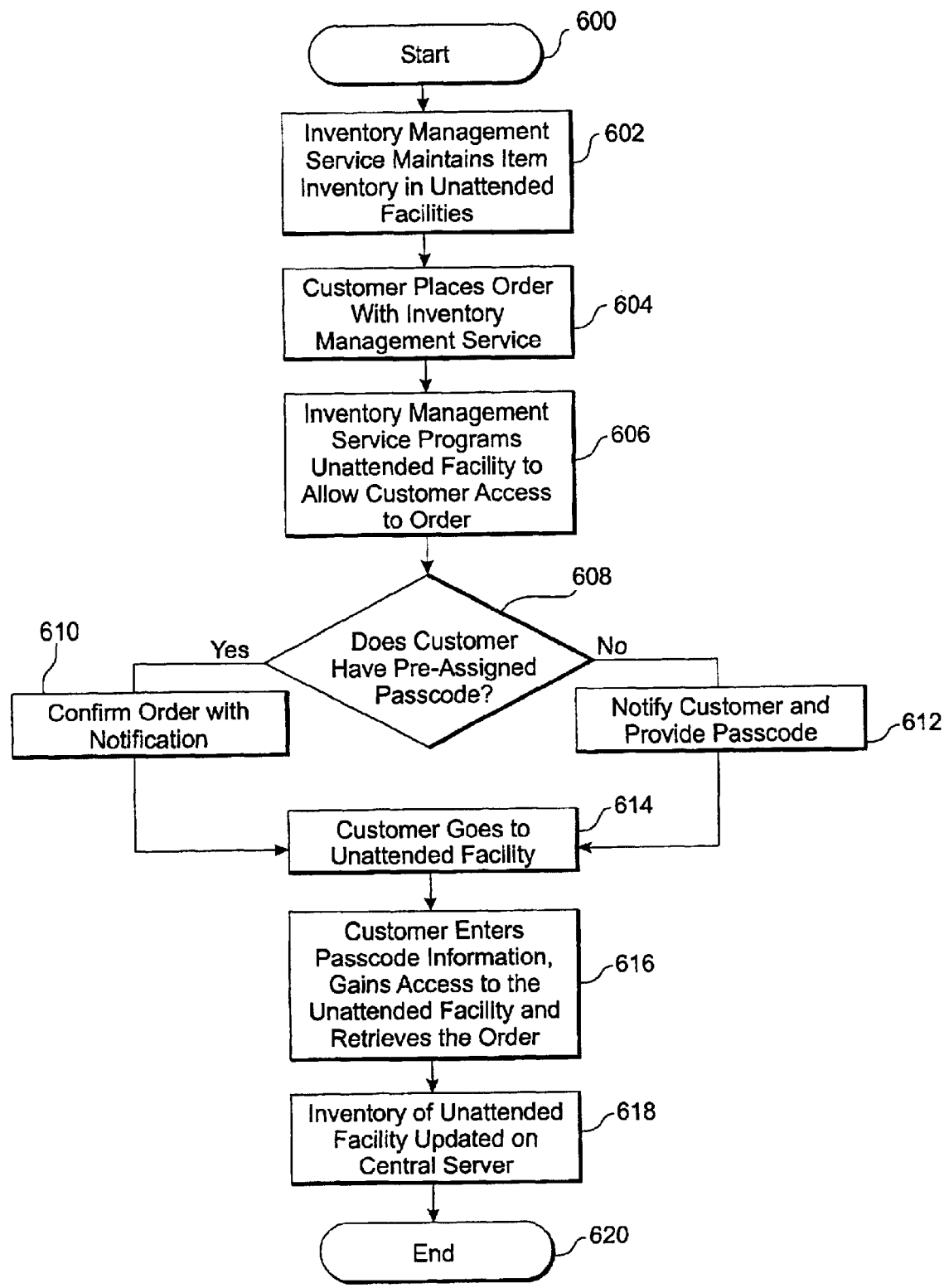
FIG. 6 is an exemplary flowchart describing the steps for a customer to order and retrieve items from an unattended facility that are maintained in the inventory of the unattended facility by an inventory management service in an embodiment of the invention.
Figure 7:
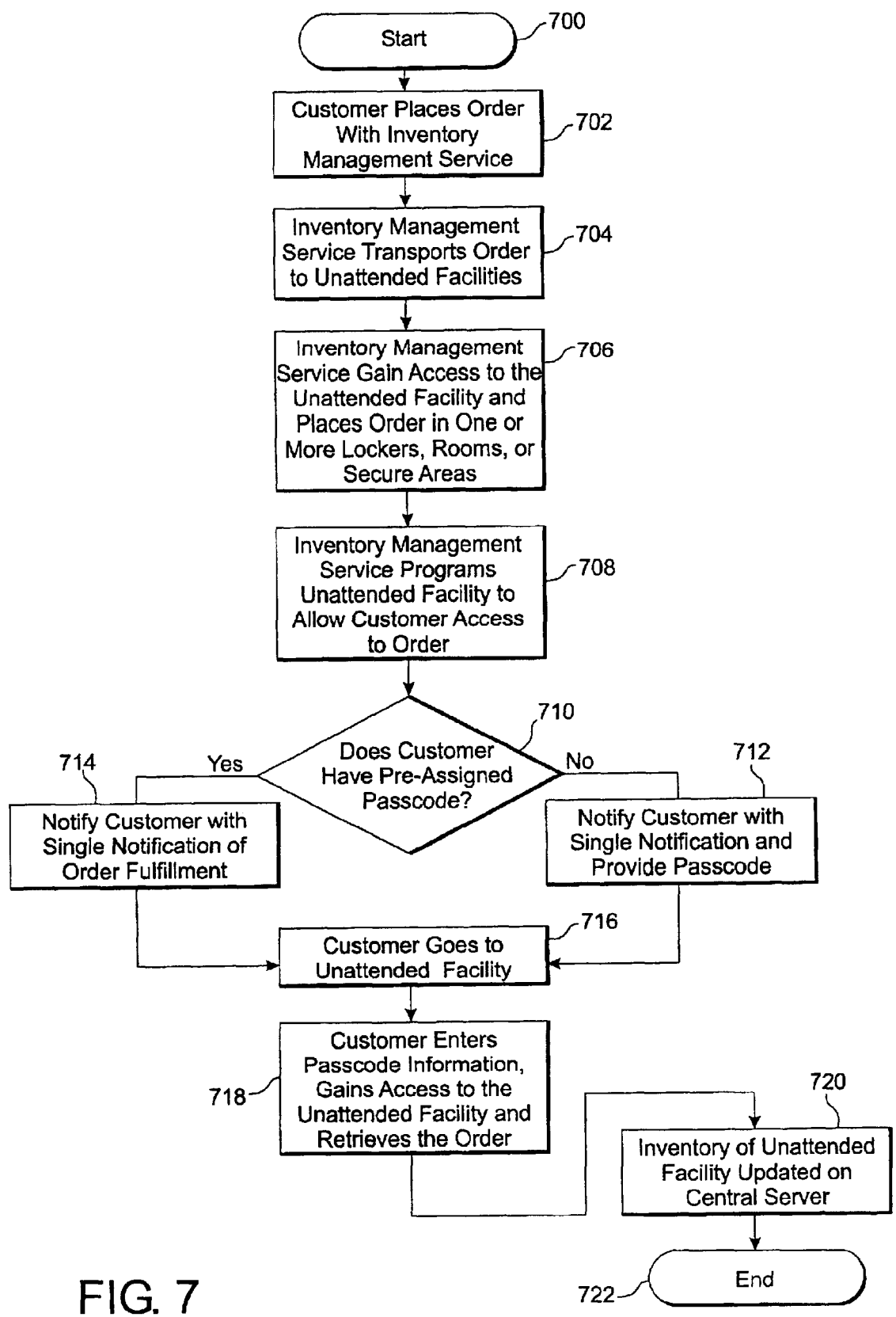
FIG. 7 is an exemplary flowchart describing the steps for a customer to order and retrieve items from an unattended facility that are not normally maintained in the inventory of the unattended facility by an inventory management service in an embodiment of the invention.
Figure 8:
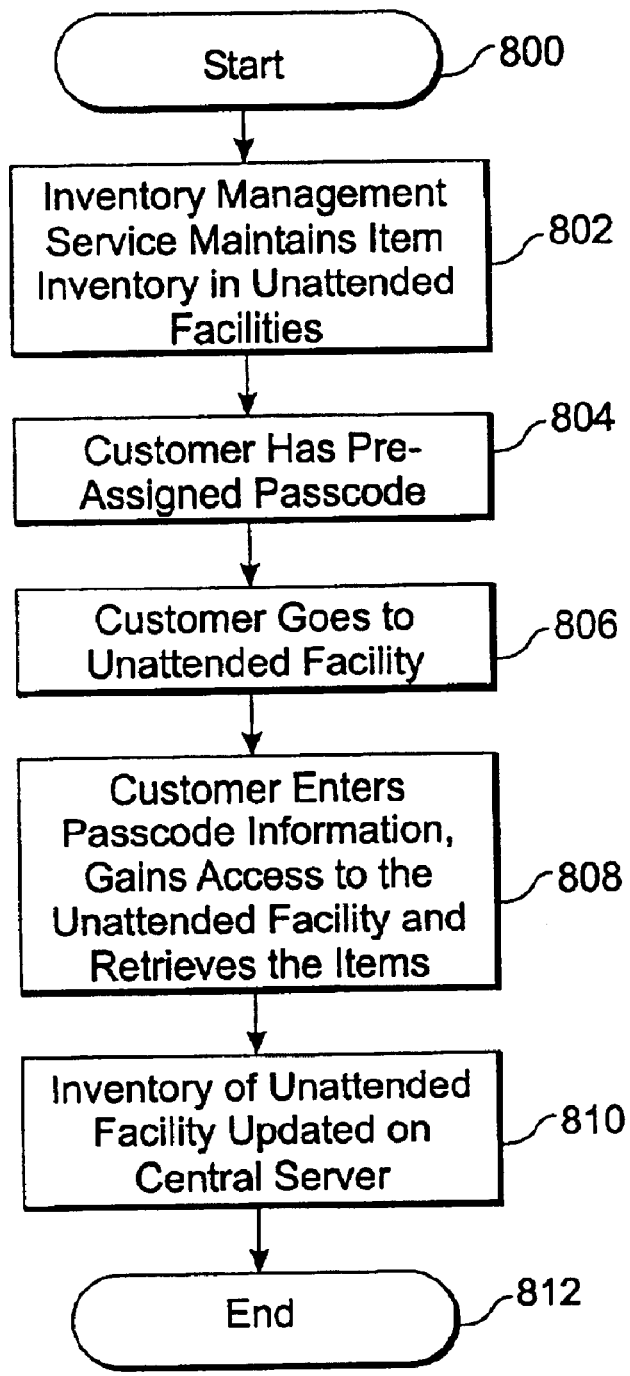
FIG. 8 is an exemplary flowchart describing the steps for a customer retrieve items from an unattended facility that are maintained in the inventory of the unattended facility by an inventory management service in an embodiment of the invention.

FIGS. 6, 7, and 8 are flow charts illustrating the steps described above for a customer to order and retrieve parts that are kept in the inventory of an unattended inventory facility, for a customer to order parts that are not generally kept in the inventory of an unattended inventory facility and then later pick that order up at an unattended inventory facility, and for a customer to retrieve parts from an unattended inventory facility without previously having placed an order for the parts, respectively.

In FIG. 6, the inventory management service maintains inventory items in an unattended facility (Step 602). This involves keeping various items in quantities determined by the customer and the customer's use or by the inventory management service in the unattended facility. In Step 604, a customer places and order with an inventory management service. In Step 606 the inventory management service programs the unattended facility to provide the customer with access. This can be done either at the unattended facility through a data entry device or through an interface to the central server via the network. Step 608 determines whether the customer who placed the order has a pre-assigned passcode. If so, then the customer may be provided a notification that confirms the order (Step 610). If not, then the customer is provided a notification including a passcode (Step 612). In Step 614 the customer goes to the unattended facility to retrieve the order. In Step 616 the customer enters passcode information into the data entry device at the unattended facility, gains access to the secure enclosures that contain the items that comprise the order, and retrieves the items. In Step 618, the system automatically updates the inventory of the unattended facility on the central server.

In FIG. 7, a customer places and order with an inventory management service (Step 702). Because in this embodiment the inventory management service does not keep an inventory of the items requested in the order in an unattended facility, the inventory management service transports them to (Step 704) and places them in an unattended facility (Step 706). In Step 708 the inventory management service programs the unattended facility to provide the customer with access. This can be done either at the data entry device of the unattended facility or through the interface with the central server via the network. Step 710 determines whether the customer who placed the order has a pre-assigned passcode. If not, then the customer is provided a single notification with the notification including a passcode (Step 712). If the customer does have a passcode, then the customer receives a single notification that the order is now ready for pick up at the unattended facility (Step 714). In Step 716 the customer goes to the unattended facility to retrieve the order. In Step 718 the customer enters passcode information into the data entry device at the unattended facility, gains access to the secure enclosures that contain the items that comprise the order, and retrieves the items. In Step 720, the system automatically updates the inventory of the unattended facility on the central server.

FIG. 8 describes the steps for a customer who has a pre-assigned passcode to retrieve items from an unattended facility without first ordering such items from the inventory management service. An inventory management service maintains an inventory of items in an unattended facility (Step 802). In Step 804, it is provided that the customer has a pre-assigned passcode. The customer then goes to the unattended facility (Step 806). The customer then enters the pre-assigned passcode into the data entry device to gain access to the unattended facility and the secure enclosures that contain the items sought by the customer. The customer may also be required to indicate the items being retrieved and the quantity of each item. The customer then retrieves the items (Step 808). In Step 810, the inventory of the unattended facility is automatically updated on the central server from the passcode information entered by the customer, any additional customer entered information and from the monitoring of the doors of the secure enclosures of the unattended facilities by the processors.

Figure 9:
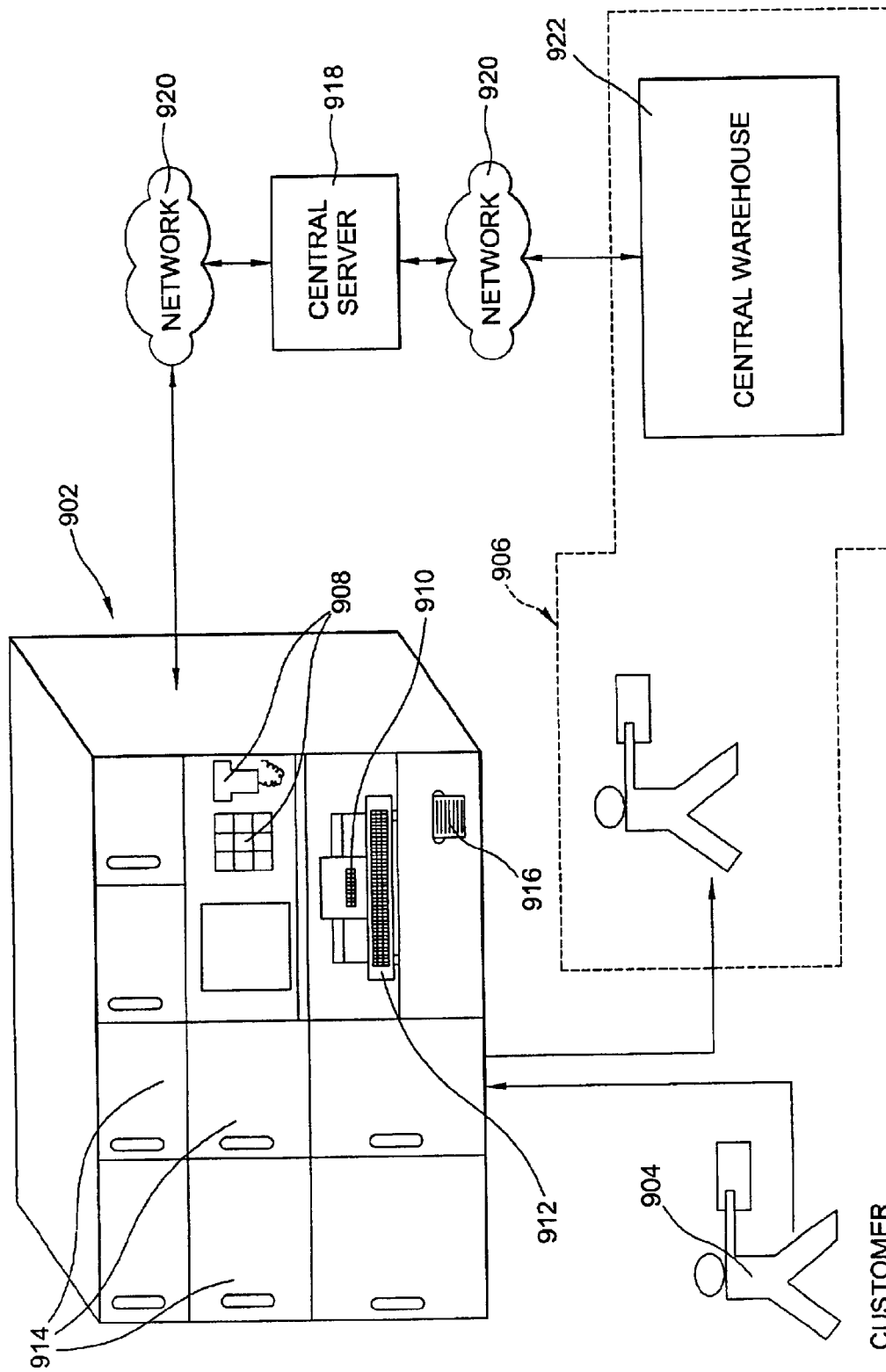
FIG. 9 is a pictorial view of an exemplary embodiment of a system for a customer to return items to an unattended drop off facility and for these items to be retrieved by an inventory management service in an embodiment of the invention.

FIG. 9 illustrates another embodiment of the present invention involving an unattended drop off facility (902). Parts received by a customer (904) but not used may need to be returned by the customer (904) to the inventory management service (906). Further, used or damaged parts may need to be returned to the inventory management service (906) or a manufacturer for repair or warranty purposes. It may be very inconvenient for a customer (904) to obtain a return authorization and then return the part to the inventory management service (906) or manufacturer, or to prepare it for shipment and have it shipped to the inventory management service (906) or manufacturer. Returned parts also may be processed more effectively and efficiently by the inventory management service (906) or manufacturer if they have advanced information about the part being returned such as, for example, the type and model of the part, the reason for return, whether the part has been used or is unused and whether it is "good," "bad" or returned under "warranty," the customer (904) that is returning the part, etc.

An unattended drop off facility (902) utilizes an unattended facility similar to the facility (200) as shown in FIG. 2 and described above. Similar to an unattended inventory facility (508), an unattended drop off facility (902) may also utilize secure enclosures comprised of lockers, rooms or secure areas (914). A customer (904) returning a part to an unattended drop off facility (902) first enters a passcode into a data entry device (908) at the unattended drop off facility (902). This passcode may be pre-assigned and reusable by the customer (904), or it may be assigned for the purposes of returning this particular item. For example, the customer (904) may have a permanently assigned passcode that provides the customer (904) with access to the unattended drop off facility (902), or the customer (904) may contact the inventory management service (906) through a communications device (118, 418) and be assigned a passcode that may limit the number of times or the amount of time in which the customer (904) may access the unattended drop off facility (902). The customer (904) will then enter certain return information into the data entry device (908). This return information may include, for example, a user ID, a company name, return type (i.e., "good," "bad," "warranty"), a return reason (for a "bad" part), a part number, a requisition or order number, etc.

If needed, the customer (904) may also create a return identifier (910) that is associated with the return part. The return identifier (910) provides information about the return part and the customer (904) such as whether the part is "good" or "bad", the customer's name (or company name), etc. Such information may be encoded upon the return identifier (910) or it may be in text. The customer (904) may selectively initiate generation of the return identifier (910) (e.g., print return labels or encode an RFID tag) as needed for the return part. For example, the system may allow the user to specify: (1) that they don't need any return identifier; (2) that they need a "defective part" return identifier; or (3) that they need a "non-defective part" return identifier. The return identifier (910) may take the form of a barcode, a non-programmable RFID tag, a programmable RFID tag, etc. The unattended drop off facility (902) may have a device such as, for example, a barcode printer (912), an RFID programmer, etc., that has the ability to create the return identifier (910) from information entered into the data entry device (908). Alternatively, rather than selectively initiating the generation of the return identifier, the required return identifier (910) may be automatically generated by the return system based upon the return information. In other embodiments, the return identifier (910) may be pre-existing, categorized as to whether the return part is "good" or "bad", and associated with the return part by the customer (904). These pre-existing return identifiers (910) may be provided in bulk at the unattended drop off facility (902) location. Alternatively, the return part may already have a return identifier (910) (e.g., barcoded return label or an RFID tag) associated with it. In that instance, the unattended drop off facility's (902) system allows the customer (904) to scan the return identifier (910) thus reducing the amount of information that the customer (904) will have to enter about the return part and the transaction.

Once the return identifier (910) is associated with the return part by the customer (904), the customer (904) is given access to a secure enclosure (914) in which to place the return part. The unattended drop off facility (902) may be designed in such a manner that all return parts are placed in a single secure enclosure (914) or else it may be designed where each returned part is placed in an individual secure enclosure (914). The customer (904) places the return part in the secure enclosure (914) and closes the door (204) thus locking the return part within the secure enclosure (914). The customer (904) may then be provided a receipt (916) from the unattended drop of facility system (902) for the return transaction as documentation of returning the part. The return information entered into the data entry device (908) will be sent to the central server (918) via the network (920). This return information will be used for pre-processing of the return part by the inventory management service (906). Pre-processing will allow the inventory management service (906) to more effectively and efficiently handle the returned part if it is returned to the central warehouse (918). It can also facilitate decisions as to whether the returned part will be repaired, placed back into inventory, returned to a manufacturer, disposed of, etc.

The return information may also enable the inventory management service (906) to make inventory logistics decisions. An alternative embodiment of the unattended drop off facility (902) is where the unattended drop off facility (902) is incorporated into or co-located with an unattended inventory facility (508). Here, upon the entry of the return information by the customer (904), if the return part is "good," the return system electronically checks inventory levels of the return part at the associated unattended inventory facility (508). If the inventory of that part at the associated unattended inventory facility (508) (on-hand and in-transit) is below its maximum authorized quantity, the inventory management service (904) will place the returned "good" part into the proper secure enclosure (914) to which that part is assigned and the "on-hand" inventory of that part for that unattended inventory facility (508) will be increased. If the inventory of the unattended inventory facility (508) is at or above its maximum authorized quantity, the return part will be brought to the central warehouse (922) for further disposition or to another unattended inventory facility (508). Alternatively, if the inventory of the returned part at the associated unattended inventory facility (508) (on-hand and in-transit) is below its maximum authorized quantity, the inventory management service (904) may leave the returned part in the secure enclosure (914) as it was placed by the customer (904), and that secure enclosure (914) will then be updated on the central server as containing a "good" available to be included in the inventory of the associated unattended inventory facility (508), and the "on-hand" inventory of that part for that unattended inventory facility (508) will be increased.

This system serves to rapidly distribute inventory to locations where it is most needed. Transportation costs may also be reduced as the returned "good" part is not always transported to a central warehouse and then distributed back to the unattended secure locker/rooms.

If the returned part is placed in an unattended drop off facility (902) that is not co-located with an unattended inventory facility (508), then a "good" part may be retrieved from the unattended drop off facility (902), brought back into the central warehouse (922) and placed in inventory there, or placed in inventory at another unattended inventory facility (508). If the part is "bad" it will be retrieved from the unattended drop off facility (908) and brought to the central warehouse (922) for further processing by the inventory management service (906).

When retrieving a returned part from an unattended drop off facility (902), the inventory management service (906) may utilize its own personnel or a courier to retrieve the parts. The parts may be retrieved on a scheduled basis or they may be retrieved promptly after placement in the unattended drop off facilities (902). If the unattended drop off facility (902) is co-located with an unattended inventory facility (508) then parts may be retrieved by the inventory management service (906) at the same time the unattended inventory facility (508) is being re-stocked. When retrieving parts from an unattended facility (508, 902) a passcode is entered into the data entry device (908). This passcode allows the person retrieving the parts access to the lockers, rooms or secure areas (914) that contained the returned parts placed there by customers (904). The "good" retrieved parts may also be placed in other unattended inventory facilities (508) before being brought to a central warehouse (922) in order to maintain parts inventories in other unattended inventory facilities (508).

Figure 10:
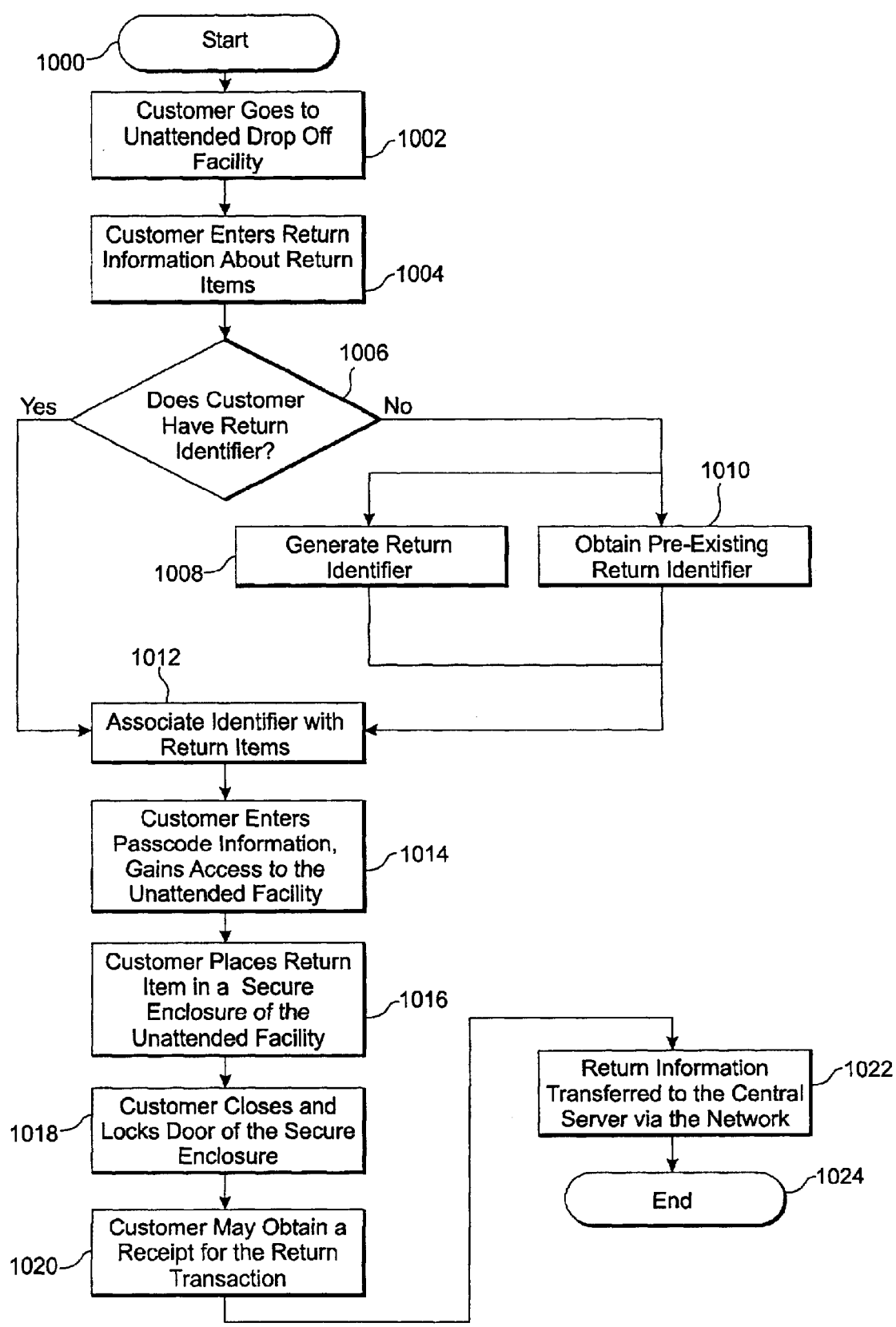
FIG. 10 is an exemplary flowchart of the steps for a customer to return items to an unattended drop off facility and for these items to be retrieved by an inventory management service in an embodiment of the invention.

FIG. 10 is a flow chart describing the steps to utilize an unattended facility for the return of items. In Step 1002, the customer transports a return item to an unattended drop off facility. The customer then enters return information about the return item into the data entry device at the unattended drop off facility (Step 1004). It is then determined whether the return item has a return identifier (Step 1006). If not, then a device at the unattended drop off facility is used to generate a return identifier from the entered return information (Step 1008), or a pre-existing return identifier is obtained (Step 1010). The return identifier is then associated with the return item (e.g., by attaching it to the return item) (Step 1012). In Step 1014, the customer then utilizes a passcode to access the unattended drop off facility. This may be a passcode that was pre-assigned to the customer or one that was assigned just so the customer may return the specific items. The customer then places the return item into a secure enclosure of the unattended drop off facility (Step 1016). The door of the secure enclosure is then closed and locked (Step 1018). The customer may then obtain a receipt for the return transaction (Step 1020). Information about the return item is then transferred to the central server via the network to begin pre-processing of the return item (Step 1022).

The previously described systems comprised of an unattended facility connected to a central server via a network with an interface with an inventory management service enable the inventory management service to monitor and control inventory levels of parts contained within the unattended inventory facilities. When a person gains access to an unattended facility by use of a passcode, unlocks the door of a locker, room or secure area (either automatically or selectively) and places parts into or removes parts from the secure enclosure, such information is electronically monitored by the processors and transferred to the central server via the network where it is recorded. In this manner, the inventory of parts in individual lockers, rooms or secure areas of unattended facilities may be tracked. This parts inventory may be monitored by software applications that utilize the parts inventory information to determine whether the inventory of parts in an unattended inventory facility is below a predetermined minimum level. If the inventory of a particular part in a particular unattended inventory facility is below the predetermined minimum level, then the software application will automatically create a re-stocking order that is transmitted to the interface of the inventory management service. Additional parts will be obtained from the central warehouse, or from manufacturers (if necessary), by the inventory management service for re-stocking. The re-stocking order may include, for example, identification of the unattended inventory facility that is to be re-stocked, a unique code assigned to each part stocked in a locker, room or secure area of an unattended inventory facility, a part number, etc.

The parts will be transported to the unattended inventory facility that has an insufficient parts inventory, the re-stock person will enter a passcode that allows them access to the unattended inventory facility and to the secure enclosures that contain or are supposed to contain the parts that have an insufficient inventory. This passcode may have been automatically generated by the central server and transmitted to the central warehouse or supplier via the re-stocking order. The re-stock person will place additional parts in the secure enclosures such that the predetermined minimum inventory level of that part for that unattended inventory facility will be met or exceeded but the predetermined maximum inventory level of that part will not be exceeded. Likewise, such monitoring can be used to control whether "good" parts removed from an unattended drop off facility that is co-located with an unattended inventory facility may be placed into the inventory of the unattended inventory facility or whether they should be taken to the central warehouse for inventory consolidation or distributed to other unattended inventory facilities. The system will then notify the inventory management service via the central server that the particular part has been restocked at that site and the inventory quantity will be increased.

Therefore, the described invention provides systems utilizing unattended facilities that are remote from a central warehouse yet monitored, maintained and stocked by an inventory management service. Such systems may be located in close proximity to one or more customers of the inventory management service such that the delay caused by retrieving or returning parts by such customers is minimized. Furthermore, locating the unattended facilities in close proximity to more than one customer provides a method whereby the multiple customers located nearby may conveniently pool their inventory of parts thus reducing each customer's total individual inventory costs. Finally, unattended drop off facilities located remotely from a central warehouse provide a convenient method for a customer to return unused, used, or damaged parts and begins processing of the returned part so that handling and disposition of the return part is expedited.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for the unattended distribution and retrieval of returned items by an inventory management service, comprising:

providing an unattended facility comprised of at least one secure enclosure at a location that is remote from a central warehouse and that is geographically close to a plurality of customers of the inventory management service;

receiving information from said plurality of customers regarding a certain plurality of service parts that comprise an inventory of items that are to be placed in the unattended facility;

placing paid inventory of items in said unattended facility;

maintaining said inventory of items within one or more secure enclosures of the unattended facility;

allowing said plurality of customers to access the inventory of items, as needed;

receiving from at least one of said plurality of customers a request for delivery of an order comprised of one or more items that are not included in the inventory of items;

responding to the request for delivery transporting the order from the central warehouse to the unattended facility and placing the items that comprise the order in the one or more secure enclosures of the unattended facility;

providing a single notification to the customer that the items comprising the customer's order have been placed in one or more secure enclosures of the unattended facility;

securely maintaining the order within the unattended facility until the order is retrieved up by the customer; and allowing the customer to access the order within the unattended facility.

2. The method of claim 1 wherein the single notification includes a passcode and said passcode is used by the customer to gain access to the secure enclosures of the unattended facility so that the customer may retrieve the items comprising the order.

3. The method of claim 1 wherein the single notification is an electronic page to a wireless electronic paging device.

4. The method of claim 1 wherein the single notification is an electronic mail message sent to the customer.

5. The method of claim 1 wherein the single notification is a telephonic transmission sent to the customer.

6. A method for the return of a return item to an unattended facility, comprising:
   providing an unattended facility located remote from a central warehouse, the unattended facility comprised of one or more secure enclosures with each secure enclosure having a door with a lock; a data entry device; and a processor wherein the processor is configured to lock or unlock the lock on the door when a passcode is entered into the data entry device;
   returning a return item comprised of one or more return parts to the unattended facility;
   entering return information about said return item into the data entry device;
   associating the return item with a return identifier, wherein the return identifier contains information about the return item including a status of the return item that indicates whether said return item is used or unused;
   placing the return item in the one or more secure enclosures of the unattended facility and closing and locking each door of the secure enclosure in which the return item is placed;
   transmitting the return information from the unattended facility to a central server via a network; and
   utilizing the return information to process the return item prior to the return item's arrival at the central warehouse.

7. The method of claim 6, further including the steps of:
   securely maintaining the return items in the one or more secure enclosures of the unattended facility until they are retrieved;
   accessing the one or more secure enclosures of the unattended facility that contain the return items by entering the passcode into the data entry device; and
   retrieving the return item from one or more secure enclosures of the unattended facility and transporting the return item to a central warehouse.

8. The method of claim 6, further comprising creating said return identifier at the unattended facility.

9. The method of claim 6, further comprising creating a receipt for the return item placed in the unattended facility.

10. The method of claim 6, further comprising attaching the return identifier to the return item by a person returning the return item to the unattended facility.

11. A method of inventory management utilizing an unattended facility comprising:
   providing an unattended facility located remote from a central warehouse, the unattended facility comprised of one or more secure enclosures with each secure enclosure having a door with a lock; a data entry device; and a processor wherein the processor configured to lock or unlock the lock on the door when a passcode is entered into the data entry device;
   maintaining an inventory of items comprised of a plurality of service parts in the secure enclosures of the unattended facility;
   receiving a return item comprised of one or more return parts at the unattended facility;
   associating the return item with a return identifier, wherein said return identifier includes information about the return item including a status for the return item that indicates whether the return item is used or unused;
   receiving return information about the return item into the data entry device wherein the return information includes the status for the return item;
   receiving the return item in one or more secure enclosures of the unattended facility and having the door of each of this secure enclosures in which the return item is placed closed and locked;
   transmitting the return information from the unattended facility to a central server via a network;
   determining whether the return item is acceptable or not acceptable for placement into the inventory of items of the unattended facility from the status of the return item;
   responsive to a finding of the return item being acceptable, placing the return item into the inventory of items of the unattended facility; and
   responsive to a finding of the return item not being acceptable, returning the return item to the central warehouse and utilizing the return information to process the return item prior to the return items's arrival at the central warehouse.

12. The method of claim 11, further comprising creating a receipt at the unattended facility for the return item.

13. The method of claim 12 further comprising associating a return identifier with the return item.

14. The method of claim 13 further comprising creating a return identifier at the unattended facility.

15. A method of inventory management of unattended facilities comprising:
   providing one or more unattended facilities located remote from a central warehouse, each unattended facility comprised of one or more secure enclosures with each secure enclosure having a door with a lock; a data entry device; and a processor wherein the processor configured to lock or unlock the lock on the door when a passcode is entered into the data entry device;
   receiving a return item comprised of one or more service parts at the unattended facility;
   receiving return information about the return item into the data entry device;
   determining a status of the return item from the return information, wherein said status indicates whether the return item is used or unused; and
   comparing the status to a predetermined status and responsive to said status being a predetermined status, designating the return item as an inventory item in one of the unattended facilities.

16. A method of inventory management utilizing an unattended facility comprising:
   providing an unattended facility located remote from a central warehouse, the unattended facility comprised of one or more secure enclosures with each secure enclosure having a door with a lock; a data entry device; and a processor wherein the processor configured to lock or unlock the lock on the door when a passcode is entered into the data entry device;
   maintaining an inventory of items comprised of a plurality of service parts in the secure enclosures of the unattended facility;
   receiving a return item comprised of one or more return parts at the unattended facility;
   attaching a return identifier to the return item, wherein said return identifier includes information about the return item;
   receiving return information about the return item into the data entry device wherein the return information includes a status for the return item; and receiving the return item in one or more secure enclosures of the unattended facility and having the door of each of the secure enclosures in which the return item is placed closed and locked.

17. The method of claim 16, further comprising:

comparing the status of the return item to a predetermined status to determine whether the return item is acceptable or not acceptable for placement into the inventory of items of the unattended facility from the status of the return item;

responsive to a finding of the return item being acceptable, placing the return item into the inventory of items of the unattended facility; and responsive to a finding of the return item not being acceptable, returning the return item to the central warehouse and utilizing the return information to process the return item prior to the return item's arrival at the central warehouse.

18. The method of claim 17, wherein the status indicates whether the return item is used, unused, good or bad.

19. The method of claim 16, further comprising creating a receipt at the unattended facility for the return item.

20. The method of claim 16, further comprising creating a return identifier at the unattended facility.

21. A method of inventory management utilizing an unattended facility comprising:

providing an unattended facility located remote from a central warehouse, the unattended facility comprised of one or more secure enclosures with each secure enclosure having a door with a lock; a data entry device; and a processor wherein the processor configured to lock or unlock the lock on the door when a passcode is entered into the data entry device;

receiving a return item comprised of one or more return parts at the unattended facility;

associating a return identifier with the return item, wherein said return identifier includes information about the return item;

receiving return information about the return item into the data entry device, wherein the return information includes a status for the return item that indicates whether the return item is used or unused; and receiving the return item in one or more secure enclosures of the unattended facility and having the door of each of the secure enclosures in which the return item is placed closed and locked.

22. The method of claim 21, further comprising:

comparing the status of the return item to a predetermined status to determine whether the return item is acceptable or not acceptable for placement into an inventory of items comprised of a plurality of service parts at the unattended facility from the status of the return item;

responsive to a finding of the return item being acceptable, placing the return item into the inventory of items of the unattended facility; and responsive to a finding of the return item not being acceptable, returning the return item to the central warehouse and utilizing the return information to process the return item prior to the return item's arrival at the central warehouse.

23. The method of claim 21, further comprising creating a receipt at the unattended facility for the return item.

24. The method of claim 21, further comprising creating a return identifier at the unattended facility.

25. A method for the return of a return item to an unattended facility, comprising:

providing an unattended facility located remote from a central warehouse, the unattended facility comprised of one or more secure enclosures with each secure enclosure having a door with a lock; a data entry device; and a processor wherein the processor is configured to lock or unlock the lock on the door when a passcode is entered into the data entry device;

returning a return item comprised of one or more return parts to the unattended facility;

entering return information about said return item into the data entry device;

attaching a return identifier to the return item, wherein the return identifier contains information about the return item including a status for the return item that indicates whether the return item is used or unused; and placing the return item in the one or more secure enclosures of the unattended facility and closing and locking each door of the secure enclosure in which the return item is placed.

26. The method of claim 25, further comprising:

transmitting the return information from the unattended facility to a central server via a network;

making the return information available at an interface at the central warehouse; and utilizing the return information to process the return item prior to the return item's arrival at the central warehouse.

27. The method of claim 25, further including the steps of:

securely maintaining the return items in the one or more secure enclosures of the unattended facility until they are retrieved;

accessing the one or more secure enclosures of the unattended facility that contain the return items by entering the passcode into the data entry device; and retrieving the return item from one or more secure enclosures of the unattended facility and transporting the return item to a central warehouse.

28. The method of claim 25, further comprising creating said return identifier at the unattended facility.

29. The method of claim 25, further comprising creating a receipt for the return item placed in the unattended facility.

30. A method for the return of a return item to an unattended facility, comprising:

providing an unattended facility located remote from a central warehouse, the unattended facility comprised of one or more secure enclosures with each secure enclosure having a door with a lock; a data entry device; and a processor wherein the processor is configured to lock or unlock the lock on the door when a passcode is entered into the data entry device;

returning a return item comprised of one or more return parts to the unattended facility;

entering return information about said return item into the data entry device, wherein said return information includes a status for the return item that indicates whether the return item is used or unused;

associating the return item with a return identifier, wherein the return identifier contains information about the return item;

placing the return item in the one or more secure enclosures of the unattended facility; and closing and locking each door of the secure enclosure in which the return item is placed.

31. The method of claim 30, further comprising:
transmitting the return information from the unattended facility to a central server via a network;
making the return information available at an interface at the central warehouse; and
utilizing the return information to process the return item prior to the return item's arrival at the central warehouse.

32. The method of claim 30, further including the steps of:
securely maintaining the return items in the one or more secure enclosures of the unattended facility until they are retrieved;
accessing the one or more secure enclosures of the unattended facility that contain the return items by entering the passcode into the data entry device; and
retrieving the return item from one or more secure enclosures of the unattended facility and transporting the return item to a central warehouse.

33. The method of claim 30, further comprising creating said return identifier at the unattended facility.

34. The method of claim 30, further comprising creating a receipt for the return item placed in the unattended facility.

35. A method for the unattended distribution and retrieval of returned items by an inventory management service, comprising:
providing an unattended facility comprised of at least one secure enclosure at a location that is remote from a central warehouse and that is geographically close to a plurality of customers of the inventory management service;
receiving information from said plurality of customers regarding a certain plurality of service parts needed by the plurality of customers that comprise an inventory of items that are to be placed in the unattended facility;
placing said inventory of items in said unattended facility;
allowing said plurality of customers to access and obtain one or more items from the inventory of items; and
monitoring the inventory of items in the unattended facility by the inventory management service and replenishing the inventory of items as needed.

36. The method of claim 35, wherein the monitoring of said inventory of items in the unattended facility by the inventory management service is performed automatically.

37. A method for the unattended distribution and retrieval of returned items by an inventory management service, comprising:
providing an unattended facility comprised of at least one secure enclosure at a location that is remote from a central warehouse and that is geographically close to a plurality of customers of the inventory management service;
receiving information from said plurality of customers regarding a certain plurality of service parts needed by the plurality of customers that comprise an inventory of items that are to be placed in the unattended facility;
placing said inventory of items in said unattended facility;
allowing said plurality of customers to access and obtain one or more items from the inventory of items; and
allowing said plurality of customers to return said one or more items to the unattended facility if said one or more items are unused.

38. The method of claim 37, further comprising monitoring the inventory of items in the unattended facility by the inventory management service and replenishing the inventory of items as needed.

39. The method of claim 37, wherein the monitoring of said inventory of items in the unattended facility by the inventory management service is performed automatically.

40. A method for the unattended distribution of items and retrieval of returned items by an inventory management service, comprising:
providing an unattended facility comprised of at least one or more secure enclosures at a location that is remote from a central warehouse and that is geographically close to a plurality of customers of the inventory management service;
receiving information from said plurality of customers regarding a certain plurality of service parts that comprise an inventory of items that are to be placed in the unattended facility;
placing said inventory of items in said unattended facility;
maintaining the inventory of items in the secure enclosures of the unattended facility;
if an order for one or more service parts is received from at least one of said plurality of customers, then
allowing said customer to access the inventory of items maintained within said unattended facility to fulfill said order; and
if a return item is to be returned to said unattended facility by at least one of said plurality of customers, then associating the return item with a return identifier, wherein the return identifier contains information about the return item including a status of the return item that indicates whether said return item is used or unused.

41. A method for the unattended distribution of items and retrieval of returned items by an inventory management service, comprising:
providing an unattended facility comprised of at least one or more secure enclosures at a location that is remote from a central warehouse and that is geographically close to a plurality of customers of the inventory management service;
receiving information from said plurality of customers regarding a certain plurality of service parts that comprise an inventory of items that are to be placed in the unattended facility;
placing said inventory of items in said unattended facility;
if an order for one or more service parts is received from at least one of said plurality of customers, then
allowing said customer to access the inventory of items maintained within said unattended facility to fulfill said order; and
if a return item is to be returned to said unattended facility by at least one of said plurality of customers, then associating the return item with a return identifier, wherein the return identifier contains information about the return item including a status of the return item that indicates whether said return item is used or unused.

* * * * *